United States Patent
Hsu et al.

(10) Patent No.: US 10,643,017 B2
(45) Date of Patent: *May 5, 2020

(54) RULE CHECKING FOR MULTIPLE PATTERNING TECHNOLOGY

(71) Applicant: TAIWAN SEMICONDUCTOR MANUFACTURING CO., LTD., Hsinchu (TW)

(72) Inventors: Meng-Kai Hsu, Hsinchu (TW); Yuan-Te Hou, Hsinchu (TW); Wen-Hao Chen, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,822

(22) Filed: Apr. 25, 2018

(65) Prior Publication Data

US 2018/0239862 A1    Aug. 23, 2018

Related U.S. Application Data

(63) Continuation of application No. 15/057,999, filed on Mar. 1, 2016, now Pat. No. 9,971,863.

(51) Int. Cl.
*G06F 30/398* (2020.01)
*G06F 119/18* (2020.01)

(52) U.S. Cl.
CPC ........ *G06F 30/398* (2020.01); *G06F 2119/18* (2020.01); *Y02P 90/265* (2015.11)

(58) Field of Classification Search
CPC ............ G06F 17/5081; G06F 2217/12; G06F 30/398; G06F 2119/18; Y02P 90/265; G03F 1/70
See application file for complete search history.

(56) References Cited

U.S. PATENT DOCUMENTS

| | | | |
|---|---|---|---|
| 5,858,580 A | 1/1999 | Wang et al. | |
| 6,811,853 B1 | 11/2004 | Sherrer et al. | |
| 6,893,958 B2 | 5/2005 | Coursey et al. | |

(Continued)

FOREIGN PATENT DOCUMENTS

| | | |
|---|---|---|
| CN | 1530752 A | 9/2004 |
| CN | 104765900 A | 7/2012 |

(Continued)

*Primary Examiner* — Vuthe Siek
(74) *Attorney, Agent, or Firm* — Maschoff Brennan

(57) ABSTRACT

A method is disclosed that includes: if there is a conflict graph including a sub-graph representing that each spacing between any two of three adjacent patterns of quadruple-patterning (QP) patterns in at least one of two abutting cells is smaller than a threshold spacing, performing operations including: identifying if one of edges that connect the three adjacent patterns of QP patterns to one another is constructed along, and/or in parallel with, a boundary between the two abutting cells; modifying multiple-patterning patterns of a layout of an integrated circuit (IC) to exclude patterns representing the sub-graph; and initiating generation of the IC from the modified multiple-patterning patterns, wherein at least one operation of identifying, modifying, or initiating is performed by at least one processor.

20 Claims, 7 Drawing Sheets

(56) References Cited

U.S. PATENT DOCUMENTS

| | | |
|---|---|---|
| 6,951,701 B2 | 10/2005 | Hsu et al. |
| 9,026,971 B1 | 5/2015 | Ho et al. |
| 9,971,863 B2 * | 5/2018 | Hsu .................... G06F 17/5081 |
| 2003/0203644 A1 | 10/2003 | Coursey et al. |
| 2014/0007026 A1 | 1/2014 | Chen et al. |
| 2015/0040077 A1 | 2/2015 | Ho et al. |
| 2017/0053057 A1 | 2/2017 | Riviere-Cazaux |
| 2017/0147740 A1 * | 5/2017 | Chang ................. G06F 17/5081 |
| 2017/0169154 A1 * | 6/2017 | Lin ..................... G06F 17/5068 |

FOREIGN PATENT DOCUMENTS

| | | |
|---|---|---|
| CN | 102623423 A | 8/2012 |
| CN | 104951584 A | 1/2014 |
| CN | 102542099 A | 7/2015 |
| CN | 103514314 A | 9/2015 |
| TW | I311690 B | 7/2009 |
| TW | I427429 B | 2/2014 |
| TW | 201539225 A | 10/2015 |

\* cited by examiner

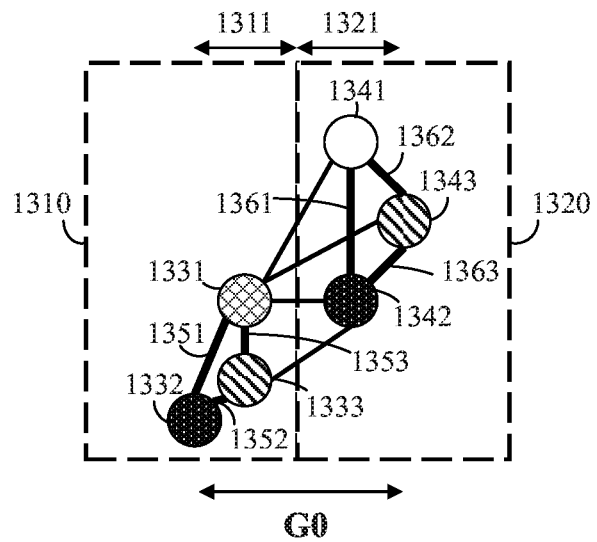
FIG. 13
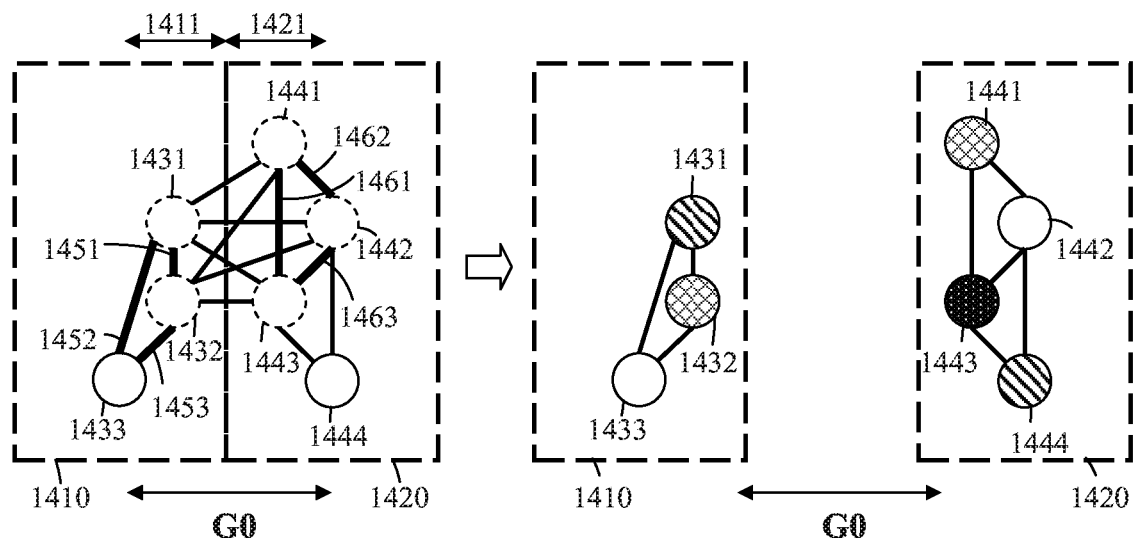
FIG. 14
FIG. 15

RULE CHECKING FOR MULTIPLE PATTERNING TECHNOLOGY

RELATED APPLICATIONS

The present application is a continuation application of the U.S. application Ser. No. 15/057,999, filed Mar. 1, 2016, all of which are herein incorporated by reference.

BACKGROUND

To use fabrication equipment purchased for larger technology nodes, multiple exposure or multi-patterning technology (MPT) has been developed. MPT involves forming patterns by using multiple different masks in succession. MPT is a layout splitting method analogous to a coloring problem for layout splitting in graph theory.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 13 is a sub-graph of two abutting cells for up-front check in FIG. 9, in accordance with various embodiments of the present disclosure.

FIG. 14 is a sub-graph of two abutting cells for up-front check in FIG. 9, in accordance with various embodiments of the present disclosure.

FIG. 15 is sub-graph which illustrates spacing cells in FIG. 14, in accordance with various embodiments of the present disclosure.

DETAILED DESCRIPTION

Figures 1, 2:
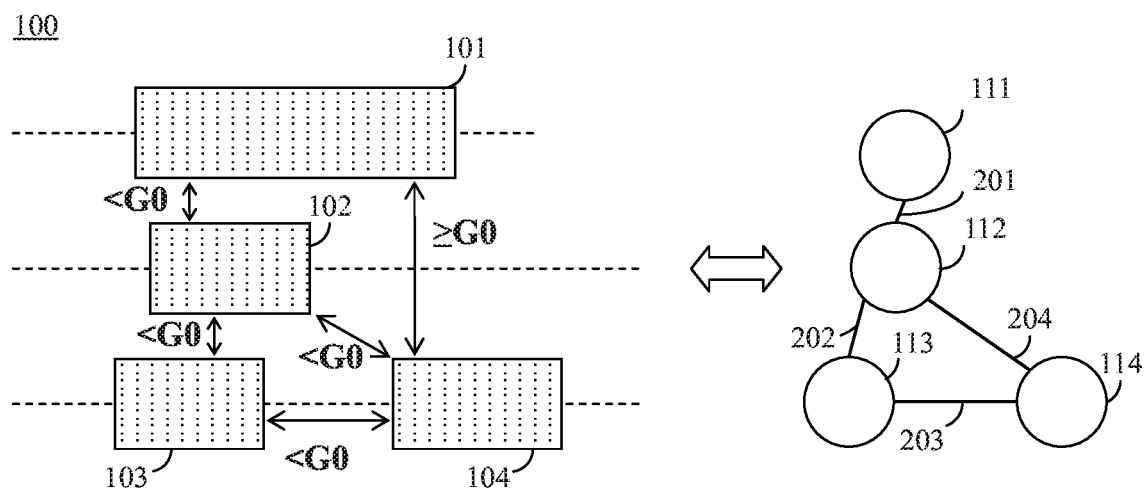
FIG. 1 is a diagram of a layout in accordance with various embodiments of the present disclosure.
FIG. 2 is a diagram of a graph representing the layout of FIG. 1 in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

FIG. 1 is a diagram of a layout 100 in accordance with various embodiments of the present disclosure. FIG. 2 is a diagram of a graph representing the layout 100 of FIG. 1 in accordance with various embodiments of the present disclosure. With reference to FIG. 1 and FIG. 2, some terms and rules are introduced below.

Multiple exposure or multi-patterning technology (MPT) involves forming patterns by using multiple different masks in succession. For illustration in FIG. 1, a layout 100 includes patterns 101-104. In some embodiments, the patterns 101-104 are formed on a same layer of an integrated circuit (IC).

In some embodiments, the patterns 101-104 are circuit patterns. The circuit patterns including, for example, interconnect metals, vias, contacts, and so forth, are interconnect patterns in a back end of line (BEOL) interconnect layer (not shown), or are active device layer patterns.

For a given IC technology including, for example, 65 nm, 45 nm, 28 nm, or the like, a respective minimum separation spacing between any two patterns is defined as a threshold spacing (labeled as G0 in FIG. 1). Two patterns, which have a spacing therebetween smaller than the threshold spacing G0, are not able to be patterned clearly using a single photo-mask and exposure.

As illustrated in FIG. 2, the graph includes nodes 111-114 representing the patterns 101-104, respectively. The "nodes" (also referred to as vertices in some embodiments) are representations of patterns and are convenient for illustration in the present disclosure. The "nodes" are also given for illustrative purposes of analyzing and assigning patterns to various photo-masks using automated tools in some embodiments.

If a given pattern in a given layer is unable to be assigned to a different mask from every adjacent pattern in the same layer, which is closer than the threshold spacing G0, a conflict is present. For illustration in FIG. 1, the spacing between any two of the patterns 101-104, except for the spacing between the patterns 101 and 104, is smaller than the threshold spacing G0. Accordingly, conflicts between any two of the patterns 101-104, except for the spacing between the patterns 101 and 104, are present. For a corresponding illustration in FIG. 2, edges 201-204 (also known as conflict edges) indicating the spacings smaller than the threshold spacing G0 are constructed between the nodes 111-114 correspondingly. As illustrated in FIG. 1 and FIG. 2, the spacing between the patterns 101 and 104 is larger than the threshold spacing G0, and accordingly, no edge is shown between the nodes 111 and 114.

With the threshold spacing G0 rule, the patterns 101-104 in the layout 100 of FIG. 1 are assigned to different photo-masks. In addition to forming patterns by using multiple different masks in succession, MPT is also a layout splitting method, analogous to an M-coloring process for layout splitting in graph theory, where M is the number of photo-masks used to expose a single layer, and/or is the number of exposures. For illustration, if two photo-masks are to be used, which indicates double patterning technology (DPT), it is customary to refer to the patterns as being assigned one of two "color types," where the color corresponds to a photo-mask assignment.

In some embodiments, MPT includes single, double, triple, and/or quadruple patterning (QP) technology. For illustration, the QP technology is used based upon the four-color theorem in which any planar graph is colored with four colors in such a way that adjacent nodes have different colors.

Figure 3:
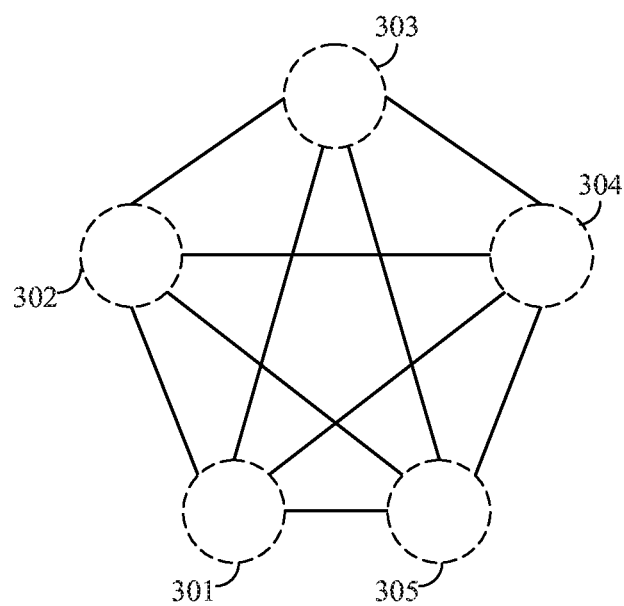
FIG. 3 is a graph for quadruple patterning technology, using the rule as discussed in FIG. 2, in accordance with various embodiments of the present disclosure.

FIG. 3 is a graph for quadruple patterning technology, using the rule as discussed in FIG. 2, in accordance with various embodiments of the present disclosure. As illustrated in FIG. 3, the graph is illustrated by a clique with five nodes 301-305 connected to one another, in which the clique is also referred to as a 5-clique in some embodiments. In graph theory, a clique generally indicates a sub-set of nodes all connected to one another. Effectively, the nodes 301-305 represents five patterns in which the spacing of any two of them is smaller than the threshold spacing G0.

In some embodiments, a layout design is referred to as "N-colorable" if layout patterns of the layout design are able to be assigned to N different patterning groups. Alternatively stated, a layout design is "N-colorable" if the nodes connected to one another are able to have N different colors from each other. For illustration in FIG. 3, the nodes 301-305 connected to one another, indicated by the 5-clique, are not able to have four different colors from each other. Accordingly, the 5-clique in FIG. 3 is not four-colorable. As a result, the 5-clique is involved in a QP violation. The QP violation indicates that the five patterns are not able to use the QP technology in some embodiments.

Figure 4:
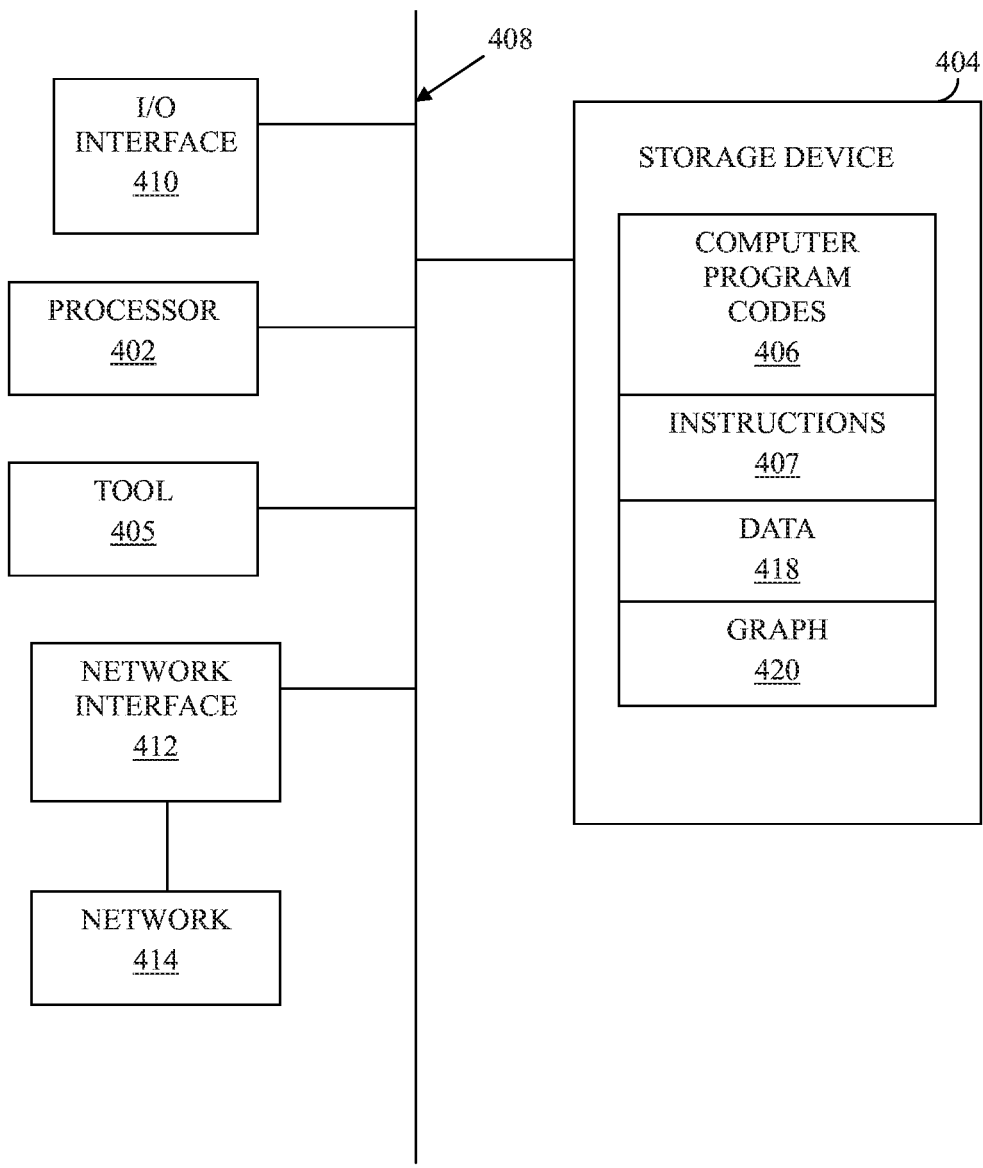
FIG. 4 is a schematic diagram of a system for multiple patterning conflict checking, in accordance with various embodiments of the present disclosure.

FIG. 4 is a schematic diagram of a system 400 for multiple patterning conflict checking, in accordance with various embodiments of the present disclosure. Labels for different components of the system 400 are illustratively provided in FIG. 4. In some embodiments, the system 400 is a computing device for design rule check methodology including, for example, checking the QP violation as discussed in FIG. 3.

Figure 5:
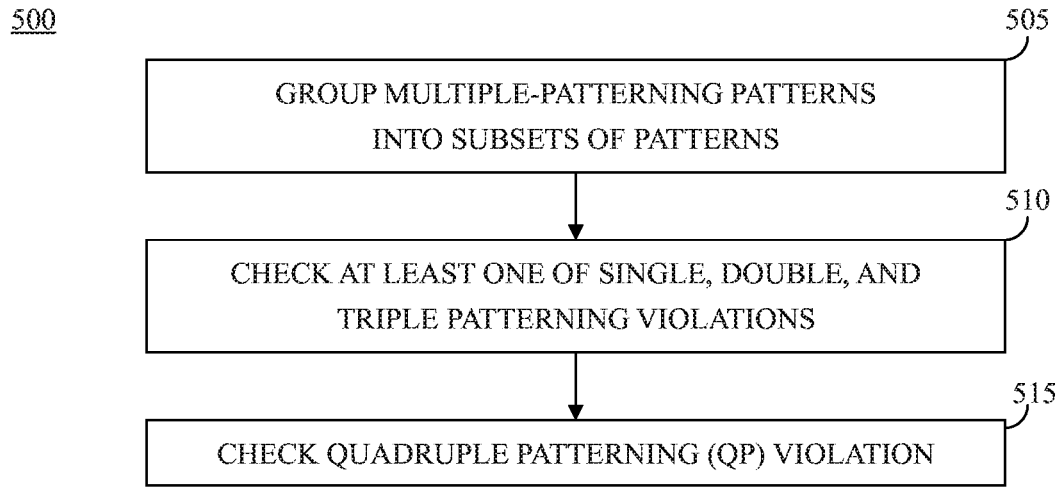
FIG. 5 illustrates a flow chart of a method of the design rule check methodology associated with the system of FIG. 4, in accordance with various embodiments of the present disclosure.
Figure 6:
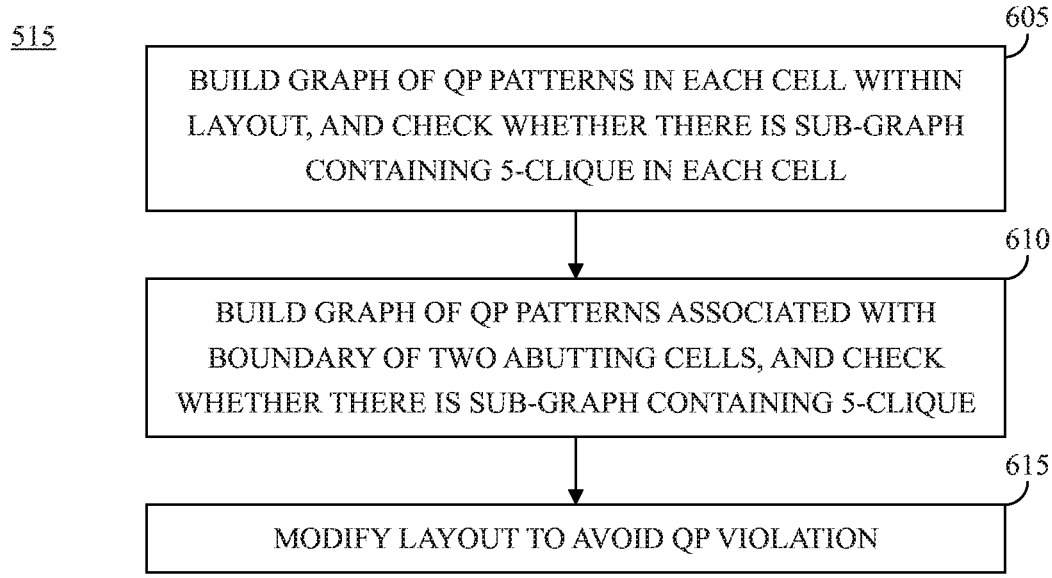
FIG. 6 is a flow chart of a method for performing the operation in FIG. 5, in accordance with various embodiments of the present disclosure.
Figure 9:
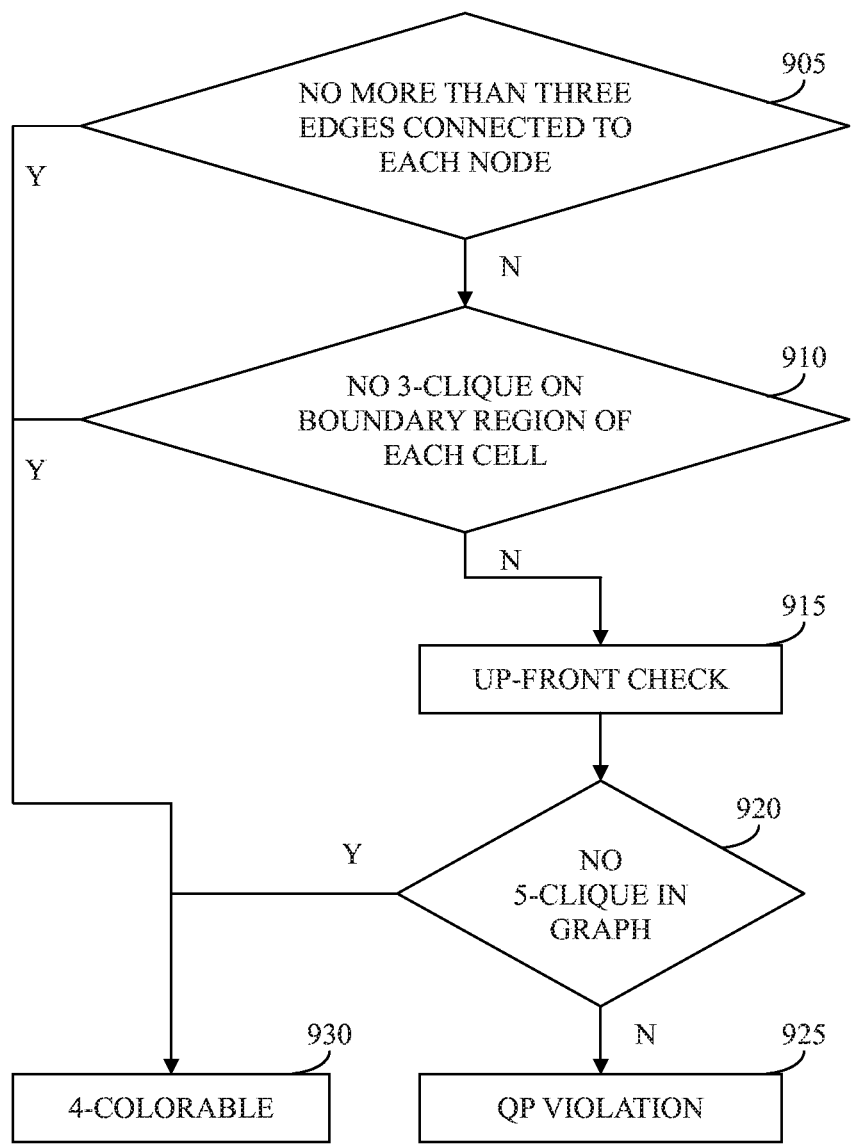
FIG. 9 is a flow chart of a method for checking 5-clique in two abutting cells in operation in FIG. 6, in accordance with various embodiments of the present disclosure.

In some embodiments, a computing apparatus, including, for example, a computer, implements the system 400. In some other embodiments, the system 400 is implemented by an electronic design automation (EDA) tool. For illustration, the system 400 includes a processor 402 and a non-transitory computer readable storage device 404 storing computer program codes 406. The processor 402 is configured to execute the computer program codes 406 stored in the computer readable storage device 404, in order for performing operations, for example, as illustrated in FIG. 5, FIG. 6 and FIG. 9.

In some embodiments, the processor 402 is implemented by, for example, a central processing unit (CPU), a multi-processor, a distributed processing system, an application specific integrated circuit (ASIC), a suitable processing unit, or the like. The aforementioned circuits or units to implement the processor 402 are given for illustrative purposes. Various circuits or units to implement the processor 402 are within the contemplated scope of the present disclosure.

In some embodiments, the computer readable storage device 404 is implemented by, for example, electronic, magnetic, optical, electromagnetic, infrared, and/or semi-conductor device (or apparatus). For example, the computer readable storage device 404 includes a semiconductor memory, a magnetic tape, a removable computer diskette, a random access memory (RAM), a read-only memory (ROM), a rigid magnetic disk, an optical disk, and the like. In the embodiments using optical disks, the computer readable storage device 404 includes, for example, a compact disk-read only memory (CD-ROM), a compact disk-read/write (CD-R/W), a digital video disc (DVD), and the like.

In some embodiments, the computer readable storage device 404 stores data 418 associated with a layout of IC. In some embodiments, the computer readable storage device 404 also stores instructions 407 for interfacing with external machines or equipments. For illustration, the computer readable storage device 404 is encoded with the instructions 407 for interfacing with a tool 405 including, for example, a lithographic tool, for fabricating semiconductor devices based on the data 418.

In some embodiments, the processor 402 is electrically coupled to the computer readable storage device 404 via a bus 408. Accordingly, the processor 402 is able to communicate with the computer readable storage device 404 via the bus 408.

Moreover, in some embodiments, the processor 402 also communicates with various peripheral apparatuses and/or external equipments via the bus 408. For illustration in FIG. 4, the processor 402 is electrically coupled to an I/O interface 410 via the bus 408. Through the I/O interface 410, the processor 402 also communicates information and commands with peripheral apparatuses including, for example, keyboard, keypad, mouse, trackball, track-pad, touch screen, cursor direction keys, displays, and the like. Various peripheral apparatuses are within the contemplated scope of the present disclosure.

In some embodiments, the processor 402 is also coupled to a network interface 412 via the bus 408, in order to access a network 414 through the network interface 412. With the network 414, the processor 402 and the computer readable storage device 404 are able to communicate with external equipments and/or equipments connected to the network 414.

The network interface 412, in some embodiments, is implemented by wireless network interfaces and/or wired network interfaces. The wireless network interfaces include, for example, BLUETOOTH, WIFI, WIMAX, GPRS, WCDMA, and the like. The wired network interfaces include, for example, ETHERNET, USB, IEEE-1394, and the like.

The configuration of the system 400 in FIG. 4 is given for illustrative purposes. Various configurations of the system 400 are within the contemplated scope of the present disclosure. For example, in various embodiments, the computer readable storage device 404 is replaced by a non-transitory computer readable storage medium that is encoded with the aforementioned executable instructions and/or computer program codes for carrying out operations, for example, as illustrated in FIG. 5, FIG. 6 and FIG. 9.

FIG. 5 illustrates a flow chart of a method 500 of the design rule check methodology associated with the system 400 of FIG. 4, in accordance with various embodiments of the present disclosure. Given for illustrative purposes, the method 500 is performed by the system 400 in FIG. 4. Various systems for performing the method 500 are within the contemplated scope of the present disclosure.

In some embodiments, the computer readable storage device 404 stores the computer program codes 406 for performing the method 500. In some embodiments, the storage device 404 also stores data 418 associated with layout of IC, for performing the method 500, and stores data and/or values generated during performing the method 500. For illustration, the data and/or values generated during performing the method 500 include graph 420, as illustrated in FIG. 4 and will be described below.

For illustration in FIG. 4 and FIG. 5, the processor 402 is configured to execute the computer program codes 406 encoded in the computer readable storage device 404, in order for performing a portion or all of the operations including, for example, operations 505, 510 and 515 as described below. The operations 505, 510 and 515 are exemplarily illustrated with reference to FIG. 4.

In operation 505, the multiple-patterning patterns are grouped into a number of subsets of patterns. In each subset, the patterns are configured to be assigned to four or less different masks. Correspondingly in FIG. 4, based on the data 418, the processor 402 executes the computer program codes 406 to generate data corresponding to multiple-patterning patterns. Moreover, the processor 402 executes the computer program codes 406 to group the data corresponding to the multiple-patterning patterns into data corresponding to a number of subsets of patterns.

For at least one of the subsets of patterns to be assigned to three or less different masks, operation 510 is then performed. In operation 510, at least one of single, double, and triple patterning violations is checked. Correspondingly in FIG. 4, the processor 402 executes the computer program codes 406 to generate the graph 420 for representing the subsets of patterns. Then, the processor 402 executes the computer program codes 406 to check whether the graph 420 have at least one of the single, double, and triple patterning violations.

In some embodiments, the single patterning (SP) violation indicates that the graph 420 has at least one edge as discussed above. For illustration, the graph 420 in FIG. 4 represents SP patterns, and the processor 402 executes the computer program codes 406 to determine whether the graph 420 is generated with the SP violation. When the graph 420 has the edge, the processor 402 executes the computer program codes 406 to identify that the SP violation occurs.

In some embodiments, the double patterning (DP) violation indicates that the graph 420 has at least one odd loop. The odd loop indicates that a polygon graph has an odd number of edges. For illustration, the graph 420 in FIG. 4 represents DP patterns, and the processor 402 executes the computer program codes 406 to determine whether the graph 420 is generated with the DP violation. When the graph 420 has the odd loop, the processor 402 executes the computer program codes 406 to identify that the DP violation occurs. Effectively, the graph 420 is 2-colorable if the graph 420 contains no odd loop.

The DP technology is a layout splitting method analogous to a two coloring process for layout splitting in graph theory, in which two "color types" are assigned. For illustration, two adjacent nodes connected with an edge are assigned to different colors. Each pattern on the layer is assigned to a first or second color, which indicates that some patterns of the first color are formed by a first photo-mask, and some patterns of the second color are formed by a second photo-mask.

In some embodiments, the triple patterning (TP) violation indicates that the graph 420 has the odd loop without any safe independent node. For illustration, the safe independent node is an independent node that is not directly connected to another independent node of any other odd loop. For illustration, the graph 420 in FIG. 4 represents TP patterns, and the processor 402 executes the computer program codes 406 to determine whether the graph 420 is generated with the TP violation. When the graph 420 has the odd loop without safe independent node, the processor 402 executes the computer program codes 406 to identify that the TP violation occurs.

For the others of the subsets of patterns to be assigned to four different masks, operation 515 is then performed. In operation 515, the QP violation is checked. In some embodiments, the QP violation indicates that the graph 420 has the 5-clique, and the 5-clique defines that each separation between any two of adjacent five patterns of the QP patterns is smaller than the threshold spacing G0.

The above illustrations in FIG. 5 include exemplary operations, but the operations are not necessarily performed in the order shown. Operations may be added, replaced, changed order, and/or eliminated as appropriate, in accordance with the spirit and scope of various embodiments of the present disclosure.

FIG. 6 is a flow chart of a method for performing the operation 515 in FIG. 5, in accordance with various embodiments of the present disclosure. With respect to the embodiments of FIG. 5, like elements in FIG. 6 are designated with the same reference numbers for ease of understanding.

Figure 7:
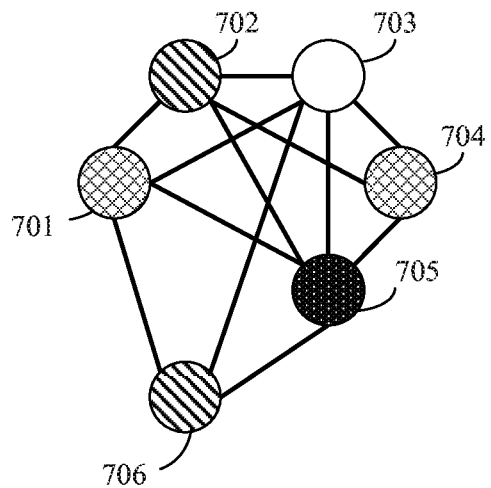
FIG. 7 is a sub-graph of a cell without 5-clique, to be checked in operation in FIG. 6, in accordance with some embodiments of the present disclosure.

In operation 605, a graph of QP patterns is built in each cell within a layout, and whether there is a sub-graph containing 5-clique in each cell is checked, as will be explained below with reference to FIG. 7. FIG. 7 is a sub-graph 700 of a cell without 5-clique, to be checked in operation 605 in FIG. 6, in accordance with some embodiments of the present disclosure. For illustration, the sub-graph 700 includes nodes 701-706 representing QP patterns within the cell. A separation between the nodes 701 and 704 is greater than the threshold spacing G0, and thus the nodes 701 and 704 have no conflict edge therebetween. A separation between the nodes 702 and 706 is greater than the threshold spacing G0, and thus the nodes 702 and 706 have no conflict edge therebetween. In FIG. 7, there is no 5-clique which shows five nodes that are connected to one another. As a result, there is no 5-clique in the sub-graph 700 as illustrated in FIG. 7.

Without 5-clique in the sub-graph 700, the QP patterns associated with the sub-graph 700 are four colorable. For illustration, the nodes 702 and 706 are colored with a first color type. The nodes 701 and 704 are colored with a second color type. The node 703 is colored with a third color type. The node 705 is colored with a fourth color type.

Correspondingly in FIG. 4, based on the data 418, the processor 402 executes the computer program codes 406 to generate the graph 420 corresponding to the QP patterns in each cell within a layout. The processor 402 also executes the computer program codes 406 to check whether the graph 420 has a sub-graph containing 5-clique which results in QP violation. When the graph 420 has the sub-graph containing 5-clique in each cell within the layout, the processor 402 executes the computer program codes 406 to identify that the QP violation occurs.

For illustration of FIG. 4 and FIG. 7, the processor 402 executes the computer program codes 406 to extract the sub-graph 700 in FIG. 7, from the graph 420, and check whether the sub-graph 700 contains 5-clique.

Figure 8:
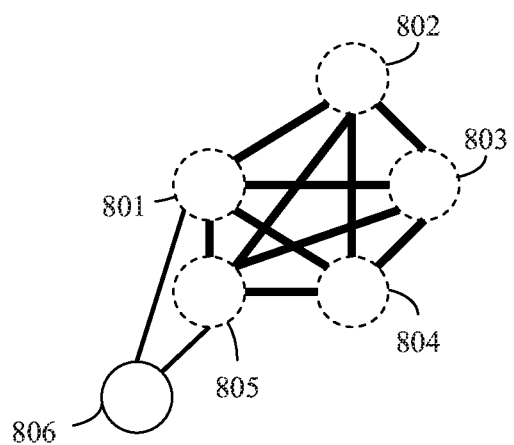
FIG. 8 is a sub-graph of a cell with 5-clique, to be checked in operation in FIG. 6, in accordance with some other embodiments of the present disclosure.

FIG. 8 is a sub-graph 800 of a cell with 5-clique, to be checked in operation 605 of FIG. 6, in accordance with some other embodiments of the present disclosure. With respect to the embodiments of FIG. 7, like elements in FIG. 8 are designated with the same reference numbers for ease of understanding. For illustration, the sub-graph 800 includes nodes 801-806 representing QP patterns within the cell. Each separation between any two of the nodes 801-805 is less than the threshold spacing G0. Accordingly, there are conflict edges connected among the nodes 801-805. Alternatively stated, the five nodes 801-805 are connected to one another. Accordingly, there is 5-clique in the sub-graph 800 in FIG. 8.

Correspondingly in FIG. 4, the processor 402 executes the computer program codes 406 to extract the sub-graph 800 as illustrated in FIG. 8, from the graph 420.

Referring back to FIG. 6, in operation 610, a graph of QP patterns associated with a boundary of two abutting cells is built, and whether there is a sub-graph containing 5-clique is checked, as will be explained below with reference to FIG. 9 and FIG. 10. Correspondingly in FIG. 4, on the data 418, the processor 402 executes the computer program codes 406 to generate the graph 420 corresponding to the QP patterns associated with a boundary of two abutting cells. The processor 402 also executes the computer program codes 406 to check whether the graph 420 has a sub-graph containing 5-clique in any two abutting cells within the layout, which results in QP violation.

FIG. 9 is a flow chart of a method for checking 5-clique in two abutting cells in operation 610 of FIG. 6, in accordance with various embodiments of the present disclosure. With respect to the embodiments of FIG. 6, like elements in FIG. 9 are designated with the same reference numbers for ease of understanding.

In operation 905, for the graph of QP patterns, whether there is no more than three edges connected to adjacent nodes within at least one of two abutting cells is checked. If there is no more than three edges connected to adjacent nodes, operation 930 is performed, in which the QP patterns are identified as being four colorable. If there are more than three edges connected to adjacent nodes, operation 910 is then performed. Correspondingly in FIG. 4, the processor 402 executes the computer program codes 406 to check whether the graph 420 has more than three edges connected to adjacent nodes within at least one of two abutting cells. When there is no more than three edges connected to adjacent nodes within at least one of the two abutting cells, the processor 402 executes the computer program codes 406 to identify the graph 420 is four colorable.

In operation 910, whether there is no 3-clique in a boundary region of each one of the two abutting cells is checked. The 3-clique defines that each separation between any two of adjacent three patterns of the QP patterns is smaller than the threshold spacing G0. If there is no 3-clique in a boundary region of each one of the two abutting cells, operation 930 is performed, as discussed above. If there is 3-clique in a boundary region of each one of the two abutting cells, operation 915 is then performed. Correspondingly in FIG. 4, the processor 402 executes the computer program codes 406 to check whether the graph 420 has a 3-clique in a boundary region of each one of the two abutting cells. Effectively, a 5-clique includes at least two 3-clique. For illustration in FIG. 8, the 5-clique is constructed by the nodes 801-805, where the nodes 801-803 constitute one 3-clique, and the nodes 803-805 constitute another 3-clique. Accordingly, if the graph 420 has no 3-clique, the graph 420 has no 5-clique.

Figure 10:
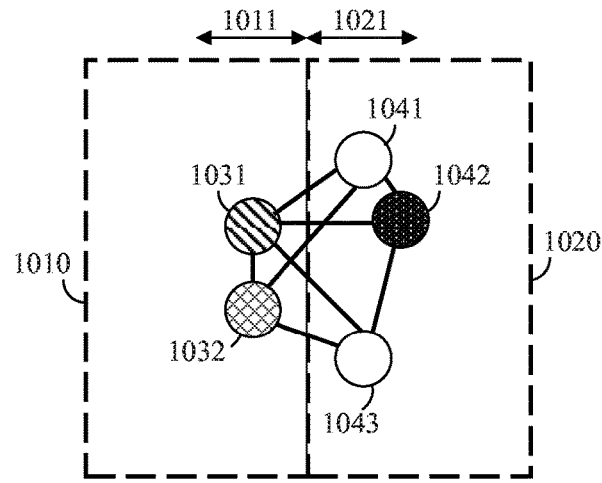
FIG. 10 is a sub-graph of two abutting cells without 3-clique, to be checked in operation in FIG. 9, in accordance with various embodiments of the present disclosure.

FIG. 10 is a sub-graph 1000 of two abutting cells 1010 and 1020 without 3-clique, to be checked in operation 910 of FIG. 9, in accordance with various embodiments of the present disclosure. In some embodiments, the processor 402 executes the computer program codes 406 to extract the sub-graph 1000 in FIG. 10, from the graph 420 in FIG. 4.

For illustration, in the sub-graph 1000, edges are connected to respective nodes 1031, 1032, 1041, 1042 and 1043. In the cell 1010, the boundary region 1011 has two nodes 1031 and 1032, and there is no 3-clique. In the cell 1020, the boundary region 1021 has three nodes 1041-1043. The nodes 1041 and 1042 that are separated by a spacing smaller than the threshold spacing G0 are connected by one edge. The nodes 1042 and 1043 that are separated by a spacing smaller than the threshold spacing G0 are connected by another edge. The nodes 1043 and 1041 that are separated by a spacing greater than the threshold spacing G0 are not connected by any edge. As a result, three nodes 1041-1043 do not constitute the 3-clique.

As described above, it is checked that the boundary regions 1011 and 1012 respectively in the two abutting cells 1010 and 1020 do not have 3-clique, as performed in operation 910. Accordingly, the QP patterns in the sub-graph 1000 are identified as being four colorable, as performed in operation 930. For illustration in FIG. 10, the node 1031 is colored with the first color type. The node 1032 is colored with the second color type. The nodes 1041 and 1043 are colored with the third color type. The node 1042 is colored with the fourth color type.

Referring back to FIG. 9, in operation 915, when there is 3-clique in a boundary region of each one of the two abutting cells, an up-front check is performed, in some embodiments, before checking whether there is no 5-clique, as will be illustrated below with reference to FIG. 11, FIG. 12, FIG. 13 and FIG. 14. Correspondingly in FIG. 4, the processor 402 executes the computer program codes 406 to perform an up-front check for the graph 420 before checking whether there is no 5-clique in the graph 420. The up-front check is explained below with reference to FIG. 11 and FIG. 12.

Figure 11:
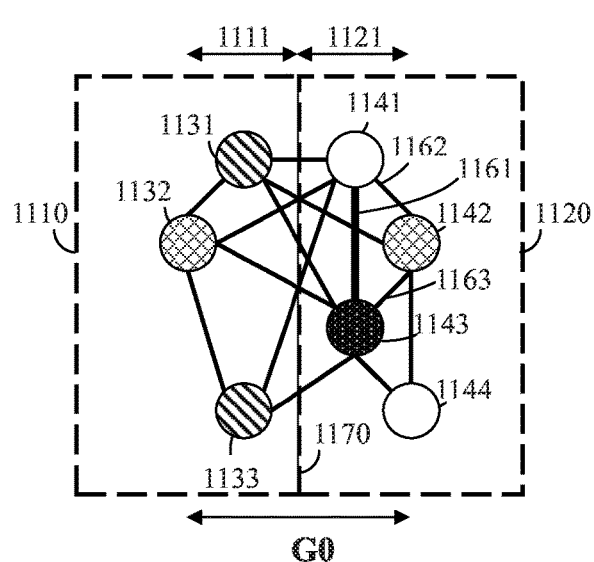
FIG. 11 is a sub-graph of two abutting cells for up-front check in FIG. 9, in accordance with various embodiments of the present disclosure.

FIG. 11 is a sub-graph 1100 of two abutting cells 1110 and 1120 for the up-front check, in accordance with various embodiments of the present disclosure. In some embodiments, the processor 402 executes the computer program codes 406 to extract the sub-graph 1100 in FIG. 11, from the graph 420 in FIG. 4.

For illustration in FIG. 11, the cell 1110 has a boundary region 1111, and the cell 1120 has a boundary region 1121. In some embodiments, the width of each one of the boundary regions 1111 and 1121 is equal to a half of the threshold spacing G0. In some embodiments, the up-front check in operation 915 in FIG. 9 is performed to identify if one of the cells 1110 and 1120 has 3-clique, as will be explained below. In further embodiments, with 3-clique in one of the cells 1110 and 1120, the up-front check in operation 915 is performed to further identify if one of edges of 3-clique in the cell is constructed along, and/or in parallel with, a boundary 1170 between the two abutting cells 1110 and 1120 as illustrated in FIG. 11, as will be explained below.

In various embodiments, the up-front check is performed to identify if only one of the cells 1110 and 1120 has 3-clique. In various embodiments, the up-front check is performed to identify if only one of edges of 3-clique in the cell is constructed along, and/or in parallel with, the boundary 1170.

For illustration, three nodes 1131-1133 are arranged in the boundary region 1111 of the cell 1110 and do not constitute a 3-clique. Four nodes 1141-1144 are arranged in the boundary region 1121 of the cell 1120, where the nodes 1141-1143 are connected by three edges 1161-1163 as illustrated in FIG. 11, and constitute a 3-clique. With the 3-clique in the cell 1120, the up-front check is further performed to identify if only one of the three edges 1161-1163 is constructed along, and/or in parallel with, the boundary 1170. The up-front check result is generated accordingly. As illustrated in FIG. 11, only one edge 1161 of the 3-clique is arranged along, and/or in parallel with, the boundary 1170. As a result, any five of the nodes 1131-1133 and 1141-1144 are determined unable to construct a 5-clique, according to the graph theory. Without the 5-clique, the QP patterns associated with the sub-graph 1100 are four colorable, according to the graph theory as discussed above.

Referring back to FIG. 9, in operation 920, based on the up-front check result, whether there is no 5-clique in the graph is checked. For illustration in FIG. 9 and FIG. 11, based on the up-front check result as discussed above in FIG. 11, it is determined that there is no 5-clique in the sub-graph 1100, and operation 930 is then performed. Accordingly, the QP patterns in the sub-graph 1100 are identified as being four colorable. Correspondingly in FIG. 4, the processor 402 executes the computer program codes 406 to determine whether there is no 5-clique in the sub-graph 1100 in FIG. 11, which is extracted from the graph 420.

As discussed above, the QP patterns in the sub-graph 1100 are identified as being four colorable. For illustration in FIG. 11, the nodes 1131 and 1133 are colored with the first color type. The nodes 1132 and 1142 are colored with the second color type. The nodes 1141 and 1144 are colored with the third color type. The node 1143 is colored with the fourth color type.

Figure 12:
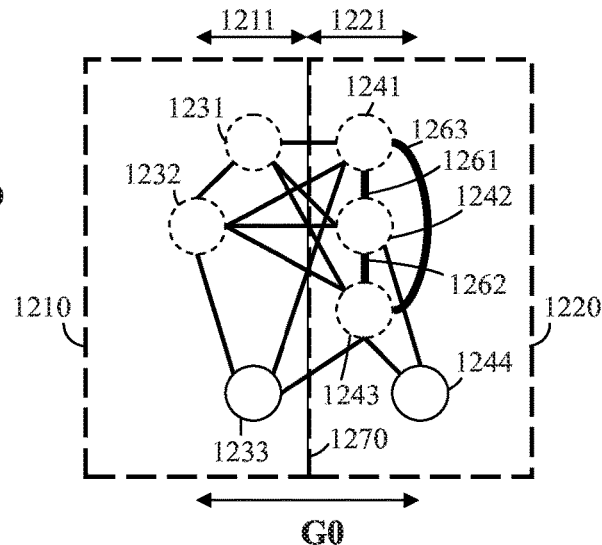
FIG. 12 is a sub-graph of two abutting cells for up-front check in FIG. 9, in accordance with various embodiments of the present disclosure.

FIG. 12 is a sub-graph 1200 of two abutting cells 1210 and 1220 for the up-front check, in accordance with various embodiments of the present disclosure. In some embodiments, the processor 402 executes the computer program codes 406 to extract the sub-graph 1200 in FIG. 12, from the graph 420 in FIG. 4.

For illustration in FIG. 12, the cell 1210 has a boundary region 1211, and the cell 1220 has a boundary region 1221. In some embodiments, the width of each one of the boundary regions 1211 and 1221 is equal to a half of the threshold spacing G0.

For illustration, three nodes 1231-1233 are arranged in the boundary region 1211 of the cell 1210 and do not constitute a 3-clique. Four nodes 1241-1244 are arranged in the boundary region 1221 of the cell 1220, where the nodes 1241-1243 are connected by three edges 1261-1263 as illustrated in FIG. 12, and constitute a 3-clique. With the 3-clique in the cell 1220, the up-front check is further performed to identify if only one of the three edges 1261-1263 is constructed along, and/or in parallel with, the boundary 1270.

For illustration in FIG. 12, all of the three edges 1261-1263 of the 3-clique are arranged along the boundary 1270. In such a condition, it is determined that there is 5-clique in sub-graph 1200 according to the graph theory. For illustration, the nodes 1231, 1232, 1241, 1242 and 1243 constitute the 5-clique. Due to the 5-clique, the QP patterns associated with the sub-graph 1200 are not four colorable, according to the graph theory as discussed above.

Referring back to FIG. 9, in operation 920, based on the up-front check result discussed above in FIG. 12, it is determined that there is 5-clique in the sub-graph 1200, and operation 925 is then performed. In operation 925, it is identified that the QP patterns associated with the sub-graph 1200 have the QP violation. Correspondingly in FIG. 4, the processor 402 executes the computer program codes 406 to identify that the QP violation occurs in the graph 420.

The above illustrations in FIG. 9 include exemplary operations, but the operations are not necessarily performed in the order shown. Operations may be added, replaced, changed order, and/or eliminated as appropriate, in accordance with the spirit and scope of various embodiments of the present disclosure.

FIG. 13 is a sub-graph 1300 of two abutting cells 1310 and 1320 for the up-front check, in accordance with various embodiments of the present disclosure. In some embodiments, the processor 402 executes the computer program codes 406 to extract the sub-graph 1300 from the graph 420 in FIG. 4.

For illustration in FIG. 13, the cell 1310 has a boundary region 1311, and the cell 1320 has a boundary region 1321. In some embodiments, the width of each one of the boundary regions 1311 and 1321 is equal to a half of the threshold spacing G0. In some embodiments, the up-front check in operation 915 in FIG. 9 is performed to identify if the different cells 1310 and 1320 both have 3-clique. In further embodiments, when the cells 1310 and 1320 both have 3-clique, the up-front check in operation 915 is performed to further identify if any projection on the boundary between the cells 1310 and 1320, of edges of the 3-clique in the cell 1310, is overlapped with any projection on the boundary, of edges of the 3-clique in the cell 1320, as will be explained below.

For illustration, three nodes 1331-1333 are arranged in the boundary region 1311 of the cell 1310 and constitute one 3-clique. Three nodes 1341-1343 are arranged in the boundary region 1321 of the cell 1320 and constitute the other 3-clique. With the 3-cliques in both cells 1310 and 1320, the up-front check is further performed to identify if any projection of edges of one 3-clique in the cell 1310 is overlapped with any projection of edges of the other 3-clique in the cell 1320.

As illustrated in FIG. 13, the nodes 1331-1333 are connected by three edges 1351-1353, and the nodes 1341-1343 are connected by three edges 1361-1363. The projections of the edges 1351-1353 on the boundary between the cells 1310 and 1320 are not overlapped with the projections of the edges 1361-1363 on the same boundary. Accordingly, it is determined that the two 3-cliques are not able to construct a 5-clique, according to the graph theory. Alternatively stated, there is no 5-clique in the sub-graph 1300. Without the 5-clique, the QP patterns associated with the sub-graph 1300 are four colorable.

As discussed above, the QP patterns in the sub-graph 1300 are identified as being four colorable. For illustration in FIG. 13, the nodes 1333 and 1343 are colored with the first color type. The node 1331 is colored with the second color type. The node 1341 is colored with the third color type. The nodes 1332 and 1342 are colored with the fourth color type.

FIG. 14 is a sub-graph 1400 of two abutting cells 1410 and 1420 for the up-front check, in accordance with various embodiments of the present disclosure. In some embodiments, the processor 402 executes the computer program codes 406 to extract the sub-graph 1400 from the graph 420 in FIG. 4.

For illustration in FIG. 14, the cell 1410 has a boundary region 1411, and the cell 1420 has a boundary region 1421. In some embodiments, the width of each one of the boundary regions 1411 and 1421 is equal to a half of the threshold spacing G0. For illustration, three nodes 1431-1433 are arranged in the boundary region 1411 of the cell 1410 and constitute one 3-clique. Three nodes 1441-1443 are arranged in the boundary region 1421 of the cell 1420 and constitute the other 3-clique. With the 3-cliques in both cells 1410 and 1420, the up-front check is further performed to identify if any projection of edges of one 3-clique in the cell 1410 is overlapped with any projection of edges of the other 3-clique in the cell 1420.

As illustrated in FIG. 14, the nodes 1431-1433 are connected by three edges 1451-1453, and the nodes 1441-1443 are connected by three edges 1461-1463. The projections of the edges 1451-1453 on the boundary between the cells 1410 and 1420 are overlapped with the projections of the edges 1461-1463 on the same boundary. Accordingly, it is determined that the two 3-cliques are able to construct a 5-clique, according to the graph theory. Based on the up-front check result, in operation 920 in FIG. 9, it is determined that there is a 5-clique, for illustration, in the sub-graph 1400. With the 5-clique, the QP patterns associated with the sub-graph 1400 are not four colorable. Afterwards, it is identified that the QP patterns associated with the sub-graph 1400 have the QP violation, as discussed above in operation 925.

After operation 925, reference is made to FIG. 6. Alternatively stated, when the QP violation is identified, operation 615 is then performed. In operation 615, the layout is modified to exclude the sub-graph containing 5-clique as discussed in operation 605 or 610, in order to avoid the QP violation, which will be explained below with reference to FIG. 15. Correspondingly in FIG. 4, in some embodiments, the processor 402 executes the computer program codes 406 to modify the data 418 corresponding to the layout in order to avoid the QP violation. In some other embodiments, the processor 402 executes the computer program codes 406 to modify the graph 420 to exclude the sub-graph containing 5-clique as discussed in operation 605 or 610.

FIG. 15 is sub-graph 1500 which illustrates spacing the cells 1410 and 1420 in FIG. 14, in accordance with various embodiments of the present disclosure. In some embodiments, the two abutting cells 1410 and 1420 are spaced apart from each other. In further embodiments, the two abutting cells 1410 and 1420 are spaced apart from each other, for a spacing that is equal to, or greater than, the threshold spacing G0.

In some embodiments, the QP patterns in the cell 1410 are spaced apart from the QP patterns in the cell 1420, for a spacing that is equal to, or greater than, the threshold spacing G0. Effectively, placement constraints are added, during placement and route (P&R) process, between the two abutting cells 1410 and 1420, in order to space the two abutting cells 1410 and 1420 apart from each other.

For illustration in FIG. 15, the nodes 1431 and 1432 are separated apart form the nodes 1441, 1442 and 1443, in which the separation therebetween is greater than the threshold spacing G0. In some embodiments, two closest nodes of the nodes 1431-1433 and 1441-1444 are spaced apart from each other for a spacing equal to, or greater than, the threshold spacing G0. When the nodes 1431 and 1432 are separated apart form the nodes 1441, 1442 and 1443, as illustrated in FIG. 15, no 5-clique is formed. Accordingly, the nodes 1431-1433 and 1441-1444 are four colorable. For illustration, the nodes 1431 and 1444 are colored with the first color type. The nodes 1432 and 1441 are colored with the second color type. The nodes 1433 and 1442 are colored with the third color type. The node 1443 is colored with the fourth color type.

Correspondingly in FIG. 4, in some embodiments, the processor 402 executes the computer program codes 406 to regenerate the graph 420 based on aforementioned modified data 418. The processor 402 executes the computer program codes 406 to extract the sub-graph 1500 from the regenerated graph 420. Moreover, in some embodiments, based on the modified data 418 as discussed above, the processor 402 executes the instructions 407 to interface with the tool 405 for fabricating semiconductor devices.

In view of above, a design rule check methodology for multi-patterning technology (MPT) is provided in the present disclosure. As a result, design rule check is able to be performed for identifying, for illustration, QP violations, based on abutment conditions of cells.

In some embodiments, a method is disclosed that includes: if there is a conflict graph including a sub-graph representing that each spacing between any two of three adjacent patterns of quadruple-patterning (QP) patterns in at least one of two abutting cells is smaller than a threshold spacing, performing operations including: identifying if one of edges that connect the three adjacent patterns of QP patterns to one another is constructed along, and/or in parallel with, a boundary between the two abutting cells; modifying multiple-patterning patterns of a layout of an integrated circuit (IC) to exclude patterns representing the sub-graph; and initiating generation of the IC from the modified multiple-patterning patterns, wherein at least one operation of identifying, modifying, or initiating is performed by at least one processor.

Also disclosed is a system that includes a storage device and a processor. The storage device is configured to store computer program codes. The processor is configured to execute the computer program codes in the storage device for performing operations including: if a graph comprises a first sub-graph representing that each spacing between any two of three adjacent patterns of quadruple-patterning (QP) patterns in at least one of two abutting cells is smaller than a threshold spacing, identifying if any projection, on a boundary between the two abutting cells, of a first plurality of edges that connect the three adjacent patterns of QP patterns to one another in one of the two abutting cells, is overlapped with any projection, on the same boundary, of a second plurality of edges that connect the three adjacent patterns of QP patterns to one another in the other of the two abutting cells; modifying the graph to exclude the first sub-graph; and initiating generation of an integrated circuit (IC) from the modified graph.

Also disclosed is a non-transitory computer readable medium comprising computer executable instructions which, in response to being executed by a processor, cause the processor to carry out a method. The method includes: for each one of subsets of patterns, of a layout of an integrated circuit (IC), to be assigned to different masks, building a graph including quadruple-patterning (QP) patterns; checking whether the graph comprises a conflict graph in two abutting cells within the layout, wherein checking whether the graph comprises the conflict graph comprises identifying if the graph comprises a first conflict graph which represents that each spacing between any two of three adjacent patterns of the QP patterns in at least one of two abutting cells is smaller than a threshold spacing; if the graph comprises the conflict graph, modifying the layout to exclude the conflict graph; and initiating generation of the IC from the modified layout.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    if there is a conflict graph comprising a sub-graph representing that each spacing between any two of three adjacent patterns of quadruple-patterning (QP) patterns in at least one of two abutting cells is smaller than a threshold spacing, performing operations comprising:
        identifying if one of a plurality of edges that connect the three adjacent patterns of QP patterns to one another is constructed along, and/or in parallel with, a boundary between the two abutting cells;
        modifying multiple-patterning patterns of a layout of an integrated circuit (IC) to exclude patterns representing the sub-graph; and
        initiating generation of the IC from the modified multiple-patterning patterns, wherein at least one operation of identifying, modifying, or initiating is performed by at least one processor.

2. The method of claim 1, wherein the QP patterns are configured to be assigned to four different masks.

3. The method of claim 1, wherein modifying the multiple-patterning patterns comprises:
    spacing apart from each other at least two closest patterns, in two abutting cells, of the multiple-patterning patterns, for a spacing that is equal to, or greater than, the threshold spacing.

4. The method of claim 1, wherein modifying the multiple-patterning patterns comprises:
    spacing apart from each other two abutting cells each including three adjacent quadruple-patterning (QP) patterns that are connected to one another by edges each having a spacing smaller than the threshold spacing.

5. The method of claim 1, wherein if the conflict graph comprises the sub-graph, the method further comprises:
    identifying if at least one projection, on a boundary between the two abutting cells, of edges that connects the three adjacent patterns of QP patterns to one another in one of the two abutting cells, is overlapped with at least one projection, on a same boundary, of edges that connects the three adjacent patterns of QP patterns to one another in the other of the two abutting cells.

6. The method of claim 1, further comprising:
    grouping the multiple-patterning patterns of the layout of the integrated circuit (IC) into a plurality of subsets of patterns to be assigned to various numbers of masks that are different from each other.

7. The method of claim 6, further comprising:
    for each one of the plurality of subsets of patterns to be assigned to masks including four masks that are different from each other, building a graph including the quadruple-patterning (QP) patterns.

8. A system, comprising:
    a storage device configured to store computer program codes; and
    a processor configured to execute the computer program codes in the storage device for performing operations comprising:
        if a graph comprises a first sub-graph representing that each spacing between any two of three adjacent patterns of quadruple-patterning (QP) patterns in at least one of two abutting cells is smaller than a threshold spacing, identifying if any projection, on a boundary between the two abutting cells, of a first plurality of edges that connect the three adjacent patterns of QP patterns to one another in one of the two abutting cells, is overlapped with any projection, on a same boundary, of a second plurality of edges that connect the three adjacent patterns of QP patterns to one another in the other of the two abutting cells;
        modifying the graph to exclude the first sub-graph; and
        initiating generation of an integrated circuit (IC) from the modified graph.

9. The system of claim 8, wherein when the graph comprises the first sub-graph, the processor is further configured to execute the computer program codes to perform an operation of:
    identifying if one of edges that connects the three adjacent patterns of QP patterns to one another is constructed along, and/or in parallel with, a boundary between the two abutting cells.

10. The system of claim 8, wherein for modifying the graph, the processor is further configured to execute the computer program codes to perform an operation of:
    spacing two abutting cells in the graph apart from each other, wherein each one of the two abutting cells includes three adjacent multiple-patterning patterns that are connected to one another by edges.

11. The system of claim 8, wherein for modifying the graph, the processor is further configured to execute the computer program codes to perform an operation of:
    spacing two abutting cells apart from each other, for a spacing that is equal to, or greater than, the threshold spacing.

12. The system of claim 8, wherein for modifying the graph, the processor is further configured to execute the computer program codes to perform an operation of:
    spacing apart from each other at least two closest patterns, in two abutting cells, of multiple-patterning patterns, for a spacing that is equal to, or greater than, the threshold spacing.

13. The system of claim 8, wherein the processor is further configured to execute the computer program codes to perform an operation of:
    building a graph representing the quadruple-patterning (QP) patterns in each cell within a layout, or in abutting cells within the layout.

14. The system of claim 8, wherein the processor is further configured to execute the computer program codes to perform an operation of:

grouping multiple-patterning patterns of a layout of the integrated circuit (IC), into a plurality of subsets of patterns to be assigned to various numbers of masks that are different from each other.

15. A non-transitory computer readable medium comprising computer executable instructions which, in response to being executed by a processor, cause the processor to carry out a method, the method comprising:

for each one of subsets of patterns, of a layout of an integrated circuit (IC), to be assigned to different masks, building a graph including quadruple-patterning (QP) patterns;

checking whether the graph comprises a conflict graph in two abutting cells within the layout, wherein checking whether the graph comprises the conflict graph comprises:

identifying if the graph comprises a first conflict graph which represents that each spacing between any two of three adjacent patterns of the QP patterns in at least one of two abutting cells is smaller than a threshold spacing;

if the graph comprises the conflict graph, modifying the layout to exclude the conflict graph; and initiating generation of the IC from the modified layout.

16. The non-transitory computer readable medium of claim 15, wherein when the graph comprises the first conflict graph, checking whether the graph comprises the conflict graph in two abutting cells within the layout further comprises:

identifying if one of edges that connects the three adjacent patterns of the QP patterns to one another is constructed along, and/or in parallel with, a boundary between the two abutting cells.

17. The non-transitory computer readable medium of claim 15, wherein when the graph comprises the first conflict graph, checking whether the graph comprises the conflict graph in two abutting cells within the layout further comprises:

identifying if any projection, on a boundary between the two abutting cells, of edges that connects the three adjacent patterns of QP patterns to one another in one of the two abutting cells, is overlapped with any projection, on a same boundary, of edges that connects the three adjacent patterns of QP patterns to one another in the other of the two abutting cells.

18. The non-transitory computer readable medium of claim 15, wherein modifying the layout comprises:

spacing two abutting cells in the layout apart from each other, wherein each one of the two abutting cells includes three adjacent QP patterns that are connected to one another by edges each having a spacing smaller than the threshold spacing.

19. The non-transitory computer readable medium of claim 15, wherein modifying the layout comprises:

spacing apart from each other at least two closest patterns, in two abutting cells, of multiple-patterning patterns, for a spacing that is equal to, or greater than, the threshold spacing.

20. The non-transitory computer readable medium of claim 15, wherein the QP patterns are configured to be assigned to four different masks.

\* \* \* \* \*